United States Patent
Jansen

(10) Patent No.: US 9,726,756 B2
(45) Date of Patent: Aug. 8, 2017

(54) MULTICHIP AUTOMOTIVE RADAR SYSTEM, A RADAR CHIP FOR SUCH A SYSTEM, AND A METHOD OF OPERATING SUCH A SYSTEM

(71) Applicant: NXP B.V., Eindhoven (NL)

(72) Inventor: Feike Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 532 days.

(21) Appl. No.: 14/539,381

(22) Filed: Nov. 12, 2014

(65) Prior Publication Data

US 2015/0153445 A1 Jun. 4, 2015

(30) Foreign Application Priority Data

Dec. 3, 2013 (EP) ..................................... 13195441

(51) Int. Cl.
*G01S 13/93* (2006.01)
*G01S 7/03* (2006.01)
(Continued)

(52) U.S. Cl.
CPC ............ *G01S 13/02* (2013.01); *B60W 30/143* (2013.01); *G01S 7/02* (2013.01); *G01S 7/032* (2013.01);
(Continued)

(58) Field of Classification Search
CPC . G01S 7/03; G01S 7/032; G01S 13/87; G01S 13/343; G01S 13/931
(Continued)

(56) References Cited

U.S. PATENT DOCUMENTS

| | | | |
|---|---|---|---|
| 2008/0278370 A1* | 11/2008 | Lachner | G01S 7/03 342/200 |
| 2009/0251362 A1* | 10/2009 | Margomenos | G01S 7/032 342/175 |

(Continued)

FOREIGN PATENT DOCUMENTS

| | | |
|---|---|---|
| CN | 101520510 A | 9/2009 |
| CN | 201457270 U | 5/2010 |

(Continued)

OTHER PUBLICATIONS

Gresham, I. et al "Ultra-Wideband Radar Sensors for Short-Range Vehicular Applications", IEEE Trans. Microwave Theory and Techniques, vol. 52, No. 9, pp. 2105-2122 (Sep. 2004).

(Continued)

*Primary Examiner* — Peter Bythrow
(74) *Attorney, Agent, or Firm* — Rajeev Madnawat

(57) ABSTRACT

A multichip radar system is disclosed, comprising a plurality of configurable ICs, and a digital interface therebetween, each configurable IC being configurable to operate as a master IC and as a slave IC. The configurable ICs may be similar or identical, and have an allocated measurement range. Each configurable IC comprises: a down-converter; an ADC; a digital signal processor; and a transmitter to transmit a radar signal. One is configured as a master IC and to transmit a radar signal and each of the other configurable ICs to operate as a slave IC. Each configurable IC is adapted to use a common Local Oscillator signal, a common clock signal, and a common timing signal for determining at least the start of the common sampling window. A method of operating such a multichip radar system is also disclosed, as is a configurable IC or radar IC suitable for such a system.

15 Claims, 8 Drawing Sheets

(51) Int. Cl.
*G01S 13/02* (2006.01)
*G01S 7/02* (2006.01)
*B60W 30/14* (2006.01)
*G01S 13/87* (2006.01)
*G01S 7/35* (2006.01)
*G01S 13/34* (2006.01)

(52) U.S. Cl.
CPC ............ *G01S 13/87* (2013.01); *G01S 13/931* (2013.01); *G01S 13/343* (2013.01); *G01S 2007/356* (2013.01)

(58) Field of Classification Search
USPC .............................................. 342/70–72, 175
See application file for complete search history.

(56) References Cited

U.S. PATENT DOCUMENTS

| | | | | |
|---|---|---|---|---|
| 2010/0171648 | A1* | 7/2010 | Himmelstoss | G01S 7/35 342/103 |
| 2010/0253568 | A1* | 10/2010 | Focke | G01S 13/424 342/118 |
| 2012/0154203 | A1* | 6/2012 | Vacanti | G01S 7/03 342/149 |
| 2013/0278306 | A1* | 10/2013 | Wixforth | H03K 3/01 327/141 |
| 2014/0266866 | A1* | 9/2014 | Swirhun | G01S 7/026 342/188 |
| 2016/0146931 | A1* | 5/2016 | Rao | H01Q 1/3233 342/59 |

FOREIGN PATENT DOCUMENTS

| | | |
|---|---|---|
| CN | 101980048 A | 2/2011 |
| CN | 203337819 U | 12/2013 |

OTHER PUBLICATIONS

Hasch, J et al. "Millimeter-Wave Technology for Automotive Radar Sensors in the 77 GHz Frequency Band", IEEE Trans. Microwave Theory and Techniques, vol. 60, No. 3, pp. 845-860 (Mar. 2012).
Saad, J. et al. "FPGA-based Radar Signal Processing for Automotive Driver Assistance System", IEEE/IFIP International Symp. on Rapid System Prototyping, pp. 196-199 (Jun. 2009).
Hyun, E. et al. "Design and Implementation of Automotive 77GHz FMCW Radar System Based on DSP and FPGA", IEEE Intl. Conf. on Consumer Electronics, pp. 517-518 (Jan. 2011).
Winkler, V. "Range Doppler Detection for Automotive FMCW Radars", European Radar Conf., pp. 166-169 (Oct. 2007).
Feger, R. et al. "A 77-GHz FMCW MIMO Radar Based on an SiGe Single-Chip Transceiver" IEEE Trans. Microwave Theory and Techniques, vol. 57, No. 5, pp. 1020-1035 (May 2009).
Extended European Search Report for EP Patent Appln. No. 13195441.4 (May 9, 2014).
Pohl, N. et al. "A low-power wideband transmitter front-end chip for 80 GHz FMCW radar systems with integrated 23 GHz down-converter VCO", IEEE J. Solid-State Circuits, vol. 47, No. 9, 1974-1980 pp. (Sep. 2012).

\* cited by examiner

MULTICHIP AUTOMOTIVE RADAR SYSTEM, A RADAR CHIP FOR SUCH A SYSTEM, AND A METHOD OF OPERATING SUCH A SYSTEM

CROSS-REFERENCE TO RELATED APPLICATIONS

This application claims the priority under 35 U.S.C. §119 of European patent application no. 13195441.4, filed on Dec. 3, 2013, the contents of which are incorporated by reference herein.

FIELD

This invention relates to multichip radar systems and to methods of operating the same, and to ICs or radar chips adapted for use in multichip radar systems.

BACKGROUND

Automotive radar systems are seen as a crucial element to increase road safety and driver comfort. The first generation of automotive radar systems targeted automatic cruise control and parking aid applications. Such a radar system 100 is shown schematically in FIG. 1. It comprises three main sections: transmit section 110, a receive section 120 and a control and processing section 130. The transmit section 110 comprises a high-frequency chirp generator 111, which produces a frequency modulated continuous wave (FMCW) at a frequency which may be, for instance, 24 GHz. The chirp signal is supplied to a phase locked loop (PLL) 112, and then frequency tripled in a frequency tripler 113 to provide a signal 141. The signal 141 is amplified by a power amplifier 114, and fed, via an antenna output connector 115, to be transmitted by a transmit aerial or antenna (not shown) as a radar signal. In the presence of a reflective object, a reflected radar signal may be received by one or more receive aerials or antenna (not shown), and input via one or more antenna input connectors 126, to the receive section 120. In the figure two receivers are shown, although it will be appreciated that the system may comprise a different number of receivers, such as one or three. Each received signal is amplified by a low noise amplifier 125 and down-converted by being mixed with a copy of the transmitter tripler output signal 141 in mixer 124. Each down-converted signal is filtered by filter 123, and digitised and dumped to a digital signal processor 131, by an analog-to-digital converter (ADC) 122. The digital signal processor 131 forms part of the control and processing section 130. The control and processing section 130 also includes a clock generator 132 for providing a clock function, together with a microprocessor and timing reference device 133 for providing appropriate timing signals. The output from the radar system may be communicated with other electronics within the automobile over a controller area network (CAN) bus 160.

In summary, then, in typical car radar systems—using "car" as an example of the automotive application field—a signal, modulated according to a specific waveform principle, is transmitted at a predetermined carrier frequency. The reflected signals are down-converted to baseband signals by the analogue receiver and processed by the digital part of the system. In these processing steps one or more of the distance to an object, the relative radial velocity, that is to say, the velocity at which the object is approaching the car, and the angle between the object and the car are calculated.

As mentioned, the modulation system described above is frequency modulated continuous wave (FMCW). FMCW is a suitable waveform for automotive radar systems due to its accuracy and robustness. In particular, the implementation in which a sequence of short duration frequency chirps is transmitted has favorable properties, for detecting objects moving with a non-zero relative radial velocity.

In FMCW based radar system the radial distance to a reflecting object is converted to a sine wave oscillating at a beat frequency determined by the slope of the frequency ramp and the time of flight to the object. It is up to the digital baseband to estimate the frequency of the sine wave; in preferred implementations this may be done by a Fast Fourier Transformation (FFT).

Modern automotive radar systems combine a high resolution with a long measurement range. As a consequence the resulting number of data points and thus required processing power is high. In addition a large number of successive measurements (chirps) are required to achieve a high relative radial velocity resolution.

Recently new applications such as EBA (Electronic Brake Assist), blind spot detection and rear cross traffic alert have started to be introduced. It is expected that in the near future several radar systems will be used to cover the whole 360° around the car. These radar systems will not be identical; each application has a different set of requirements. These requirements include (but are not limited to) distance resolution and angular resolution. The development of specialized integrated circuits (ICs) for every radar application will significantly increase the cost of a complete 360° radar solution.

As mentioned, measuring the angle of arrival to an acceptable degree of resolution may be important: the combination of the angle of arrival and the distance allows the system to project the estimated location of an object in a Cartesian or polar coordinate system. To be able to estimate this angle accurately multiple transmit and/or receiver antennas may be required. In addition each antenna has its own analogue transmitter and/or receiver and ADC. The calculation of the angle of arrival is executed in the digital part of the system. Different calculation methods, known in the art, may be used.

Currently automotive radar products and systems are based upon multiple chips each with one or more functions. (Herein, the terms "chips" and "ICs" shall be considered as interchangeable, both referring to semiconductor-based Integrated Circuits.) These systems generally have in common that the radio frequency (RF) circuits are realized on a different IC than the signal processing IC. Therefore multiple RF modules can be combined with a powerful signal processor to realize a system with longer measurement range and higher angle of arrival resolution. This gives the manufacturer the possibility to cover multiple radar applications. However, this requires an assembly of different ICs, which thus may add to the cost of the radar system overall.

In a radar system where the analogue parts and the digitals parts consist of different ICs multiple receivers and/or transmitter may be connected to one or more digital signal processors. In this way the angular resolution and measurement range can be extended. Radar systems where the analogue transmitter and receiver are combined with a digital signal processor on a single IC in order to avoid the above-mentioned assembly costs generally have a limited angular resolution due to the limited number of antennas. Since the functionality of the IC is fixed after production several different ICs then have to be developed to cover all required applications.

It would be desirable to develop a radar system which suffered to a lesser extent from one or more of the problems described above.

SUMMARY

According to a first aspect there is provided a multichip radar system, comprising a plurality of configurable ICs, and a digital interface therebetween, each configurable IC being configurable to operate as a master IC and as a slave IC, and to have an allocated measurement range; wherein each configurable IC comprises: a down-converter adapted to down-convert a respective reflected radar signal; an ADC adapted to convert the respective down-converted signal to a respective digital signal for a common sampling window to accumulate respective digital data; a digital signal processor adapted to divide the respective digital data between a plurality of measurement ranges, the digital signal processor being further adapted to receive digital data corresponding to the IC's allocated measurement range from each of the other ICs, to send digital data corresponding to each other allocated measurement range to the respective other IC, and to process the digital data in its allocated measurement range; and a transmitter adapted to transmit a radar signal; wherein a one of the configurable ICs is configured to operate as a master IC and is configured to transmit a radar signal and each of the other configurable ICs is configured to operate as a slave IC; and wherein each configurable IC is adapted to use a common Local Oscillator signal, a common clock signal, and a common timing signal for determining the common sampling window.

Thus, it may be possible to use a single design or type of IC in multiple application domains, rather than individually tailoring or designing ICs for specific application domains with the associated increased design costs; moreover, it may be possible to use a single design or type of IC in an application domain, rather than having a requirement for separate, different, master and slave ICs. By sending digital data corresponding to each other allocated measurement range to the respective other IC, this aspect may thus allow for distributed processing of the data, which may thus relax the requirement for the data processing capability and/or memory storage capability of the IC. By adapting the configurable IC to use a common Local Oscillator signal, a common clock signal, and a common timing signal for determining the common sampling window, it may be provided that the down conversion and sampling be coherent between ICs, allowing for simplified data-processing.

The configurable ICs may or may not be reconfigurable. That is to say, they may be configurable as either master or slave by one or more one-time operations, such as by blowing internal fuses, and thereafter not be reconfigurable. In other embodiments, the configurable ICs may be reconfigurable, that is to say, a configurable IC may be configured in one circumstance to operate as a slave IC, and be reconfigured in another circumstance to operate as a master IC, or vice versa. In general, prior to being configured, the configurable ICs may be similar or even identical.

In embodiments each configurable IC further comprises: a Local Oscillator generator for generating a Local Oscillator signal; a clock generator for generating a clock signal; and a timing signal generator for generating a timing signal; and wherein the Local Oscillator signal of the master IC is the common Local Oscillator signal, the clock signal of the master IC is the common dock signal and the timing signal generated by the master IC is the common timing signal. Alternatively, these common signals may be provided by a separate "service chip" and distributed to all the configurable ICs: providing each IC with the capability to generate and distribute the common signals may provide for a relatively simplified system design, and may obviate the need for the separate service chip.

In embodiments each configurable IC further comprises a local oscillator input switch and a local oscillator output switch, a dock input switch and a dock output switch, and a timing signal input switch and a timing signal output switch, wherein the master IC is configured to output the common local oscillator signal, the common dock signal and the common timing signal, and wherein the one or more slave ICs are each configured to input the common local oscillator signal, the common dock signal and the common timing signal.

In embodiments the multichip radar system is configured such that the master IC transmits the radar signal resulting in the respective reflected radar signals. The IC which is to be operated as a master IC may be predetermined, for example during system design, or may be determined in a system setup, or may be changed during a series of rounds of measurements. The master IC may be configured to transmit the radar signal resulting in the respective reflected radar signals by means of a switch in the transmitter path. The switch may be arranged to be closed in the master IC and open in the one or more slave ICs.

In particular, in embodiments the multichip radar system may be adapted to transmit multiple chirps, and further adapted to, between two successive chirps, both reconfigure the master IC to become a slave IC and reconfigure a slave IC to become the master IC. In such embodiments, the multichip radar system may be adapted to transmit multiple sequences of chirps, and may be adapted to, between successive sequences of chirps, both reconfigure the master IC to become a slave IC and reconfigure a slave IC to become the master IC. In other such embodiments, the multichip radar system may be adapted to transmit multiple individual chirps, and be adapted to, between each successive individual chirp, both reconfigure the master IC to become a slave IC and reconfigure a slave IC to become the master IC.

According to another aspect there is provided an intelligent automobile control system comprising a multichip radar system as described above, and a data processing system configured as at least one of provide at least one of a cruise control system, an electronic brake assist system, a blindspot detection system, and a rear cross traffic alert system. In particular, the data-processing system may be integrated with other functions of the automobile.

According to a further aspect there is provided a configurable IC adapted for use, both as a master IC and as a slave IC, in a multichip radar system as described above, and adapted to use an external Local Oscillator signal, an external common clock signal, and an external common timing signal for determining the sampling window. The configurable IC thus may operate as a radar IC. At any specific operating time, the configurable IC operates as a master IC or operates as a slave IC. The configurable IC may be reconfigurable such that at one operating time it operates as a master IC and at a subsequent time it operates as a slave IC, and/or vice versa.

According to a yet further aspect there is provided a method of operating a multichip radar system comprising a plurality of configurable ICs, the method comprising: allocating one of the configurable ICs as a master IC and the remainder of the configurable ICs as slave ICs; allocating a measurement range to each of the configurable ICs; operating each configurable IC using a common Local Oscillator signal, a common clock signal, and a common timing signal for determining at least the start of a common sampling window; the master IC transmitting a radar signal; each configurable IC down-converting a respective reflected radar signal; each configurable IC converting the respective down-converted signal, by means of an ADC, to a respective digital signal for the common sampling window to accumulate respective digital data; each configurable IC dividing the respective digital data between a plurality of measurement ranges; each configurable IC receiving digital data corresponding to the IC's allocated measurement range from each of the other ICs; each configurable IC sending digital data corresponding to each other allocated measurement range to the respective other IC; each configurable IC processing the digital data in its allocated measurement range; and each slave IC sending the respective result from the digital data processing to the master IC. In embodiments, a different measurement range is allocated to each of the configurable ICs. In other embodiments two configurable ICs may be allocated the same (or overlapping) measurement ranges. Accordingly, such embodiments may be able to provide a level of internal redundancy, in case, for instance of failure or partial failure of one IC, or to provide enhanced capability for internal error checking—for instance by two IC performing the same calculations and comparing results.

In embodiments, the method may further comprise the master IC generating the common Local Oscillator signal, the common clock signal, and the common timing signal. In embodiments, the radar signal is a chirp, and the method further comprises transmitting a plurality of chirps.

In embodiments, the method further comprises, between successive chirps, both reconfiguring the master IC to become a slave IC and reconfiguring a slave IC to become the master IC.

In embodiments, the measurement ranges may relate to a single dimension and dividing the respective digital data between a plurality of measurement ranges is effected by means of a fast Fourier transform into that dimension. In other embodiments the measurement ranges relate to two dimensions, and the dividing the respective digital data between a plurality of measurement ranges is effected by means of a two-dimensional fast Fourier transform into those two dimensions.

In embodiments, each configurable IC comprises at least one of at least two transmit antennas and at least two receive antennas, and the method further comprises at least one of selecting a transmit antenna of the master IC to transmit the radar signal, and selecting a receive antenna for each of the configurable ICs to receive the respective reflected radar signal.

These and other aspects of the invention will be apparent from, and elucidated with reference to, the embodiments described hereinafter.

BRIEF DESCRIPTION OF DRAWINGS

Embodiments of the invention will be described, by way of example only, with reference to the drawings, in which.

Figure 1:
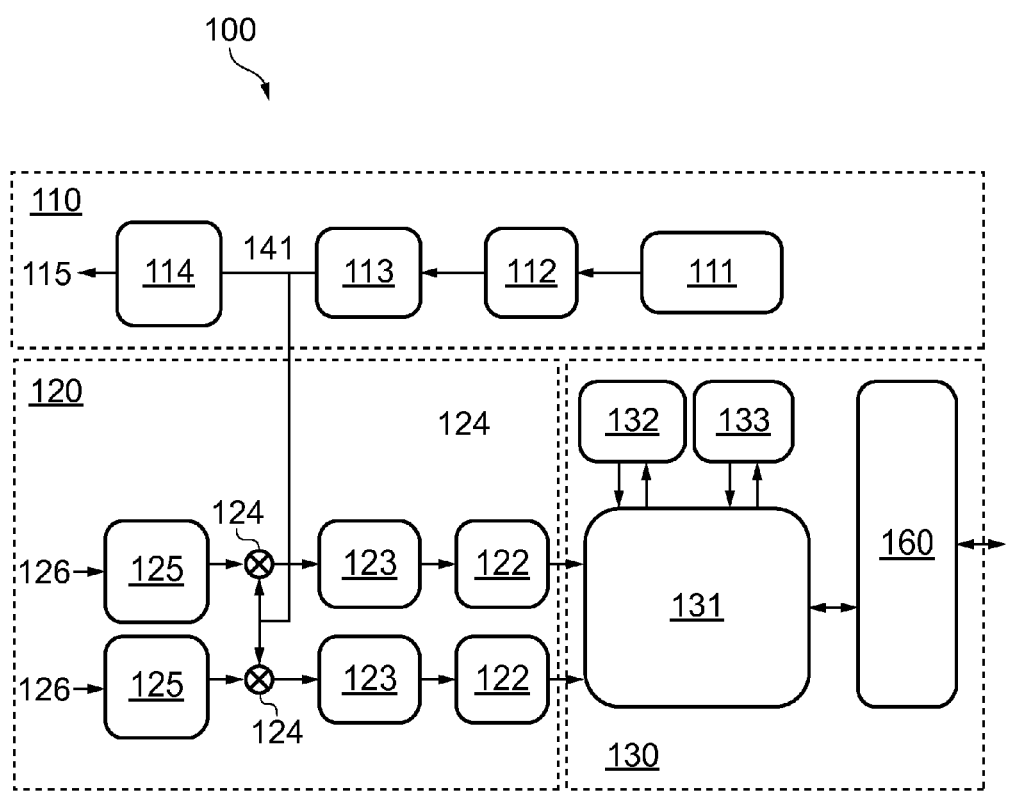
FIG. 1 shows, schematically, the basic components of a known radar system.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments

DETAILED DESCRIPTION OF EMBODIMENTS

Embodiments may provide a system and method to share the processing power of two (or more) highly integrated radar ICs by dividing the measurement range that is processed in the digital signal processors between them. Multiple application areas may be covered by combining two or more similar or even identical radar ICs.

Embodiments may benefit from the ability of a digital signal processor to split a measurement range such as distance into two or more parts. For example distance can be split into a close-by range and a far-away range. This split can be done since close-by objects result in a low beat frequency and far-away objects result in a high beat frequency. Therefore a FFT (Fast Fourier Transform) can be used to split the measurement range. By extension, the measurement range can be split into more than two parts. It will be appreciated that as used herein, the term "range", is used in a geometrical sense as a synonym for "distance", rather than in the mathematical sense of the codomain or image of a function.

Besides a split, or division, in distance the digital signal processor may also split the data in the relative radial velocity domain or even into a combination of distance and relative radial velocity. These latter options are possible when a two dimensional FFT operation is applied. Use of two dimensional FFT for analyzing both distance and velocity will be known to the skilled person.

Once the measurement data has been divided into two or more parts, each IC only processes and stores a part of the measurement range. The parts that each radar IC does not process are sent via a high speed digital interface to the other radar ICs. In this context, a "high-speed" interface may be considered to be one which transfers information at a rate of several 100 Mbit/s or more—typically up to or above 1 GBit/s. Each radar IC receives data, from the other radar ICs, that correspond to its own measurement range.

After data has been exchanged each radar IC has received signals corresponding to part of the measurement range with data originating from antennas connected directly (through its own on-chip RF transceivers) and from antennas on different radar ICs through their respective on-chip receivers.

Figure 2:
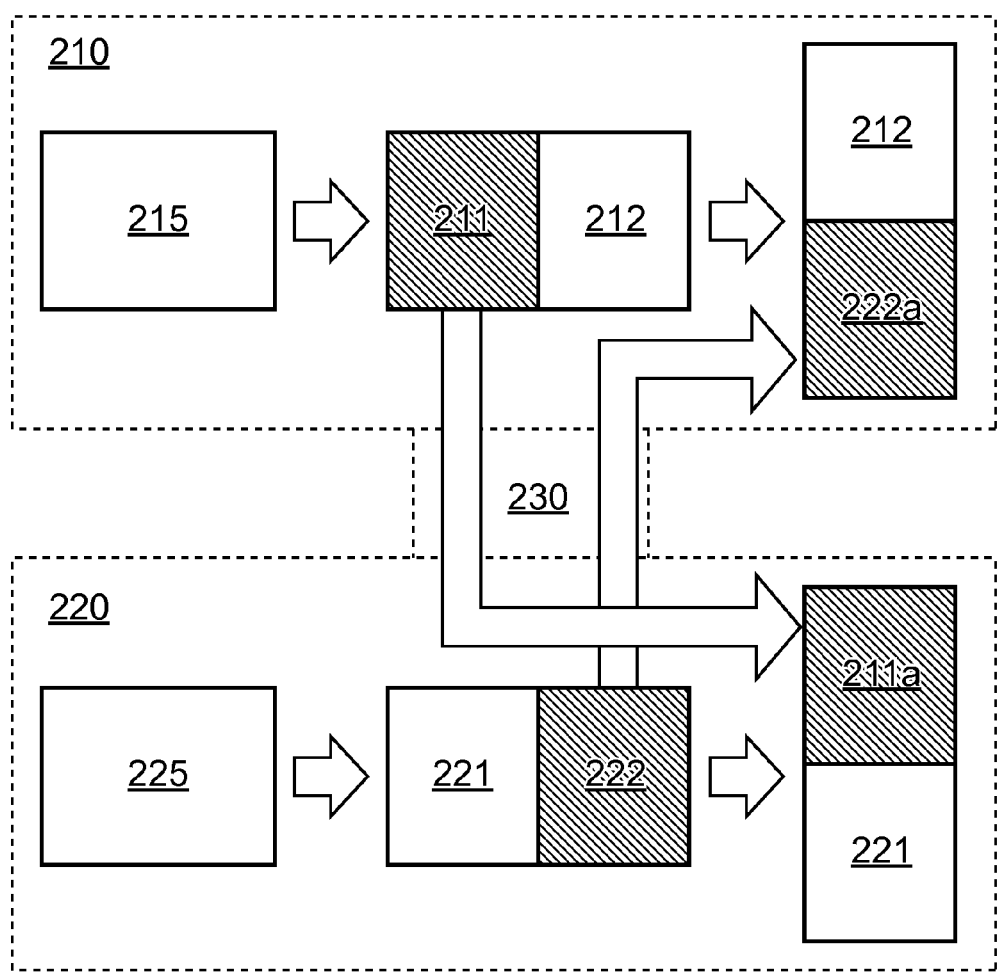
FIG. 2 shows, schematically, the concept of distributing measurement range data between two radar ICs.

This concept is shown schematically in FIG. 2. The figure shows two radar ICs 210 and 220 respectively connected by a high-speed digital interface 230. Radar IC 210 makes a radar measurement 215, and collects data 211 and 212 from the reflected, down-converted signal. Although the data is received as continuous series of data, it may be grouped in two separate parts, or tranches, corresponding to separate distances or ranges. As shown, the part 212 corresponds to relatively faraway reflections, and part 211 corresponds to relatively close-by reflections. Similarly, radar IC 220 makes a radar measurement 225, and collects data 221 and 222 from the reflected, down-converted signal. The data is grouped or divided into two separate parts, corresponding to separate distances or ranges. As shown, the part 222 corresponds to faraway reflections, and the part 211 corresponds to close-by reflections. Division of the signal into the parts may be done using a digital filter. The filter may be implemented in time domain or in frequency domain. In a preferred embodiment the system uses a fast Fourier transformation to divide the data into parts. In other embodiments a sample rate conversion in combination with a digital mixer can be used to filter out specific parts of the spectrum of the received signal. In still other embodiments, the system may use a two-dimensional fast Fourier transform, in order to transform the received signals into both distance and (relative radial) velocity dimensions.

After the received signal is divided into parts a data exchange phase is started. It will be appreciated that, since no division in velocity can generally be executed on a chirp-by-chirp basis, division into parts according to velocity is generally done after reception of a sequence of chirps. During this phase each radar IC transfers the parts outside its designated measurement range to the other radar ICs, by means of the high-speed digital interface 230. Each radar IC in its turn receives data corresponding to its own measurement range from other radar ICs. Thus, as shown in FIG. 2, data received by radar IC 220 and corresponding to faraway reflections is transferred to radar IC 210 as shown at 222a; correspondingly data received by radar IC 210 and corresponding to close-by reflections is transferred to radar IC 220, shown at 211a. Consequently, the digital signal processor of radar IC 210, now has access to 2 sets of data, 212 and 222a, each corresponding to faraway reflections; conversely, the digital signal processor of radar IC 220 now has access to 2 sets of data, 211a and 221, each corresponding to close-by reflections.

Figure 3:
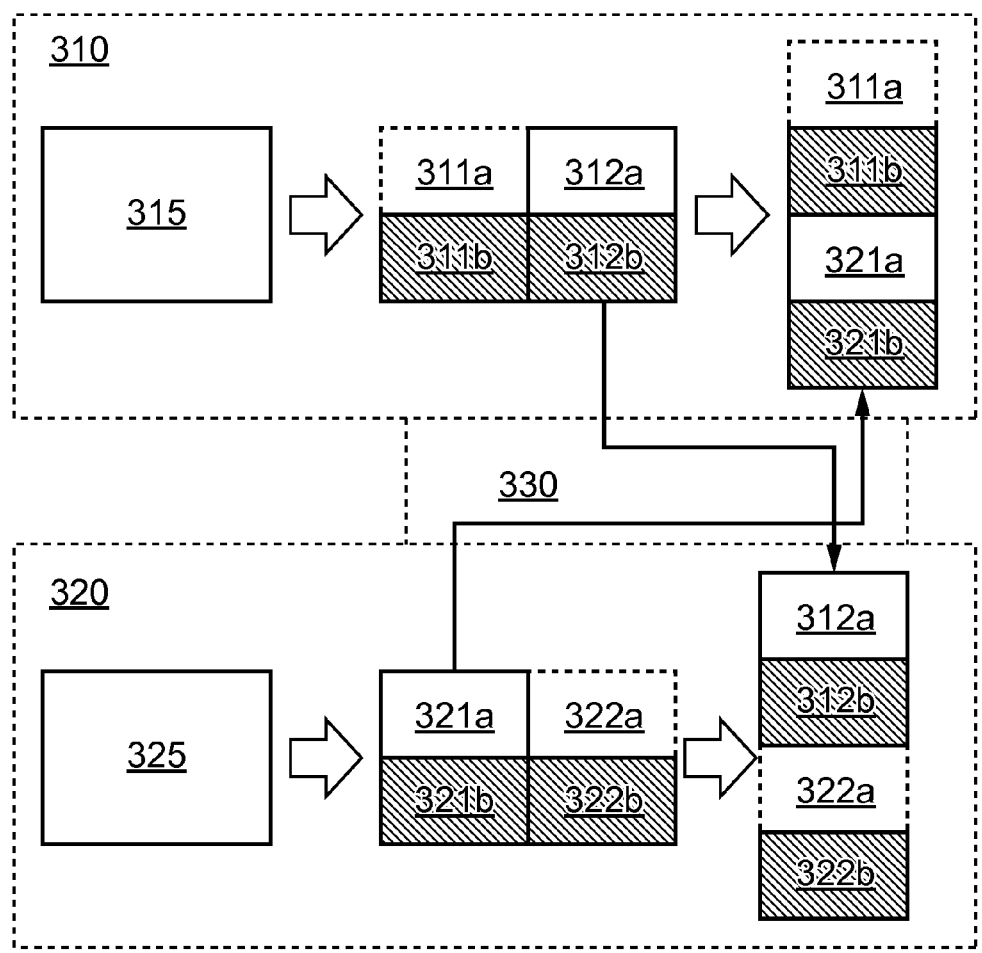
FIG. 3 shows, schematically, distributing a measurement range data between two radar ICs, each having multiple antennas.

FIG. 2 illustrates a situation where each radar IC receives reflected signal from a single antenna. However in other embodiments, each radar IC may have multiple antennas, and thus may receive multiple signals. The skilled person will appreciate that providing an IC with multiple antennas may be useful, for instance in order to provide more reflected signal data and thus improve the signal-to-noise ratio or to provide for measurement of the angle of arrival of the reflected signal. Such a situation is shown in FIG. 3, which shows two radar ICs 310 and 320: the radar measurement 315 and 325 from each IC comprises data 311, 321 from close-by reflections, and data 312, 322 from far-away reflections. However in this case, data 311 and 312 is derived from two antennas, and thus includes two data subsets (311a, 312a, and 311b, 312b). Similarly, data 321 and 322 is derived from two antennas, and thus includes two data subsets (321a, 322a, and 321b, 322b), where "a" and "b" denote the respective antenna. The data is divided in the same way as described with reference to FIG. 2. And as a result, in this case, the digital signal processor in radar IC 310 collects all the "close-by" data 311a, 311b, 321a and 321b for processing, and the digital signal process in radar IC 320 collects all the "far-away" data 312a, 312b, 322a and 322b for processing.

The skilled person will readily appreciate that the above concept, may be extended to two-dimensional signal division, such as by two-dimensional fast Fourier transform, in order to derive both distance and velocity information for a plurality of multi-antenna radar ICs.

After the data exchange phase has been completed each IC processes its own data plus the data received from other radar ICs. This post-processing step may be carried out in various ways known to the skilled person familiar with the operation of a conventional radar IC having more than one receiver antennas.

It will be appreciated, that in contrast to standalone operation, each IC now has access to more antenna signals than are directly connected via its own RF transceiver circuits. Therefore it may be possible to obtain a higher signal to noise ratio and/or a higher angle of arrival resolution using any suitable algorithm.

Figure 4:
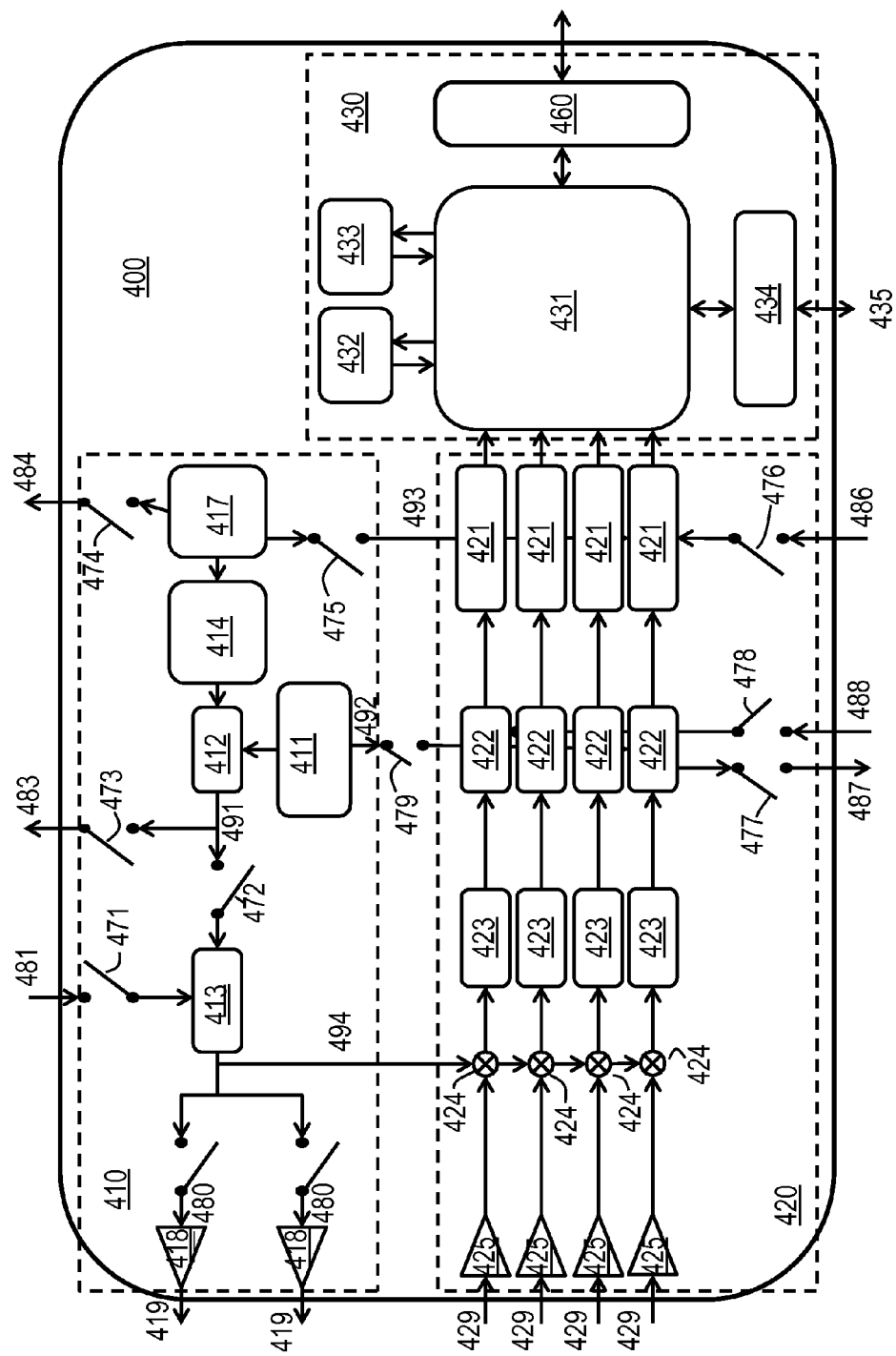
FIG. 4 shows an example of a radar IC according to embodiments, adapted for use both as a master IC and as a slave IC.

FIG. 4 shows an example of a radar IC according to embodiments, which is adapted for use, both as a master IC and as a slave IC, in a multichip radar system. The radar IC 400 consists of a RF transceiver capable of generating, transmitting and receiving radar waveforms.

Similar to known radar ICs, it comprises three main sections: a transmit section 410, a receive section 420 and a control and processing section 430. The transmit section 410 comprises a clock generator 411, the output from which is supplied to a phase locked loop (PLL) 412. In other embodiments other waveform generation techniques may be used. The frequency is swept by a sweep control 414 to the PLL 412 to produce an output chirp, which may also be considered in this context as a Local Oscillator (LO) signal 491. The start of the frequency sweep is determined by a timing engine 417. The chirp, comprising the frequency swept signal, is tripled in frequency by tripler 413 to produce a frequency tripled signal 494, amplified by one or more driver amplifiers 418 and transmitted by corresponding one or more transmit aerials or antennas (not shown) connected via antenna output connectors 419, as a radar signal. In the presence of a reflective object, a reflected radar signal may be received by one or more receivers in the receive section. The reflected radar signal is incident on one or more receive antennas (not shown) connected via antenna input connectors 429 to the receive section 420. The received signal is amplified by respective low noise amplifier 425 and down-converted by being mixed with frequency tripled local oscillator signal 494, in mixers 424. The down-converted signals are filtered in respective filters 423, and converted into sampled digital signals by means of respective analog to digital converters (ADC) 422 and respective decimators 421. The one or more ADCs 422 are clocked by means of a clock signal 492 provided from the clock generator 411. The timing of at least the start of the sampling window, that is to say, an operating window or sampling period, in the decimaters 421 is controlled by a timing signal 493 provided from the timing engine 417. Typically the timing signal controls both the start and finish of the sampling window, for instance through a binary signal which is set high for the duration of the operating window, and low at other times; in other embodiments, the timing signal may be a pulsed signal which indicates the start of the sampling window, the duration of the sampling window or the number of samples required being preset or "hard-wired" into the device. The sampled digital signals are input to digital signal processor 431. The digital signal processor 431 has associated program memory 432 and data memory 433. It may also be connected to a system interface circuit 460 forming part of the system interface, such as a connected area network bus as described above with reference to FIG. 1.

To the extent described so far, the radar IC 400 is similar to known radar ICs. In the case of radar IC 400, though, it further comprises the digital interface circuit 434 which forms part of a digital interface. The digital interface circuit may in particular be a high-speed digital interface providing for rapid exchange of data between the digital signal processor of the IC and one or more similar ICs in a multichip radar system. Furthermore, radar IC 400 according to embodiments is not constrained to use all or any of the locally-generated local oscillator signal 491, dock signal 492 and timing signal 493. To this end, the local oscillator signal 491 may be disconnected from the frequency tripler 413 by means of a switch 472. Similarly, the dock signal 492 may be disconnected from the ADC 422 by means of switch 479, and the timing signal 493 may be disconnected from the decimators 421 by means of switch 475. Furthermore, the frequency tripled local oscillator signal 494 may be disconnected from the one or more driver amplifiers 418 and corresponding one or more transmit aerials or antennas, by means of respective switches 480.

When the radar IC 400 does not use any of the locally generated local oscillator signal 491, clock signal 492 and timing signal 493, it may be considered to be operating in a slave mode; in this mode it uses corresponding externally generated signals. To this end it includes local oscillator input 481, clock signal input 488 and timing signal input 486, which may be connected to the mixers 424, ADCs 422 and decimators 421 by means of switches 471, 478, and 476 respectively. When operating in slave mode, the locally-generated LO signal 491, clock signal 492 and timing signal 493 are disconnected by means of the switches 472, 479 and 475.

When the radar IC 400 does use its locally generated local oscillator signal 491, clock signal 492 and timing signal 493 it may be considered to be operating in a master mode. As will be appreciated by the skilled person familiar with master-slave operation in multi-device systems, when operating in master mode, the radar IC 400 may provide its own locally generated local oscillator signal 491, clock signal 492 and clock timing signal 493 to all the other radar IC's 400 in the system, which are operating in slave mode. To this end, radar IC includes local oscillator output 483, clock output 487, and timing output 484, which may be connected to the local oscillator signal 491, clock signal 492 and timing signal 493 by means of switches 473, 477 and 474 respectively. Moreover, when operating in master mode, the IC 400 makes use of its own LO signal 491, clock signal 492 and timing signal 493, by closing switches 472, 479 and 475.

Figure 5:
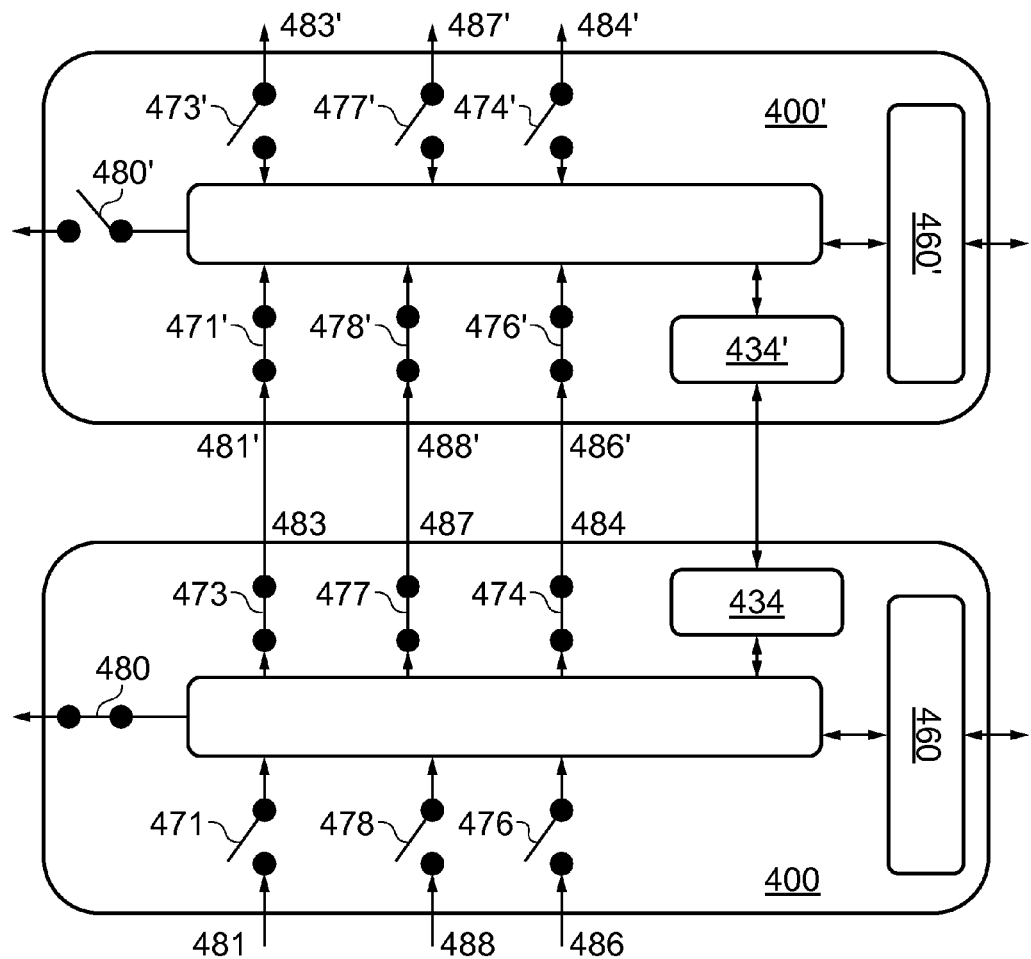
FIG. 5 shows an example of a multichip radar system comprising two radar ICs.

FIG. 5 shows an example of a multichip radar system comprising two radar ICs 400, 400' one of which (400) is operating in a master mode and the other of which (400') is operating in a slave mode. The interfaces, inputs and outputs, and switches are shown; they have the same reference numerals as those in FIG. 4 for the master IC 400, and the same reference numerals including a prime (') suffix for the slave IC 400'. The master IC 400 uses its own LO signal 491, clock signal 492 and timing signal 493 by closing switches 472, 479 and 475, and supplies its LO signal 483 and start sampling signal 484 by closing switch 473 and 474 respectively. The slave IC 400' uses the external LO signal (from the master IC 400) as input 481' and external start-sampling signal (from the master IC 400) as input 486' by closing switch 471' and 476' respectively, and prevents use of its own LO signal 491, clock signal 492 and timing signal 493 by disconnecting them by opening switches 472, 479 and 475. Furthermore, the master IC 400 supplies its clock signal 487 as an output by closing switch 477, and slave IC 400' uses that clock signal (which is, considered from slave IC 400', an externally provided signal) as input 488' by closing switch 478'.

In other embodiments, none of the ICs 400 provides internally generated local oscillator, dock, and timing signals, but these are provided to all of the ICs 400 from a "service chip". In such embodiments, whether a IC is operating in a master mode or a slave mode may depend only on other factors, such as whether it provides the transmitted radar signal for a particular chirp, or directs to which of the ICs particular parts of divided reflected signals are routed for processing, but not according to whether the IC sources the local oscillator, dock, timing, and signals. Such embodiments trade or exchange potential improved simplicity of each individual IC 400, against a more complex system overall: In particular, in such embodiments the IC 400 does not require to have generators for one or more of the local oscillator, dock and timing signals; however the system requires a separate, different "service chip" which is dedicated to provide these signals to all of the radar ICs 400.

Returning to FIG. 5, and a system in which the master IC generates the local oscillator, dock and timing signals, an example method of operation may be as follows: multiple radar ICs may be connected together by the digital interface—either two as shown, or more. During start-up or during a system setup phase each IC is assigned a measurement range. Additionally the communication is setup. Furthermore one radar IC is programmed or allocated to act as the master IC operating in master mode, and the other ICs as slave ICs operating in slave mode, as described above: the master IC supplies its local oscillator signal to the slave radar ICs in the system. For this, master IC switch 471 is opened and switches 472 (shown in FIG. 4) and 473 are dosed. For the slave radar ICs switch 471' is dosed and switches 472' (shown in FIGS. 4) and 473' are opened. Furthermore the ADC clock signal is shared by the master IC by closing switch 477 and opening switch 478. The slave ICs use the external clock input by closing switch 478' and opening switch 477'. The transmit antennas from all slave ICs 400' are disconnected by opening the slave IC switch or switches 480'. Note that in FIG. 5 only a single switch 480' is shown, corresponding to embodiments in which there is only a single transmit antenna. It will be appreciated that for embodiments with multiple transmit antennas, there may be more than one switch 480'. Furthermore, the driver amplifier (or amplifiers) is (or are) not shown, in FIG. 5, in order to aid the reader in understanding of the principle. The driver amplifier may be downstream, as described with respect to FIG. 4, or upstream of the switch or switches 480'. The transmit antenna (or antennas) of master IC 400 are engaged by ensuring that the master IC switch (or switches) 480 are closed.

To ensure that the received signal is sampled during the same time interval by all radar ICs a digital signal is generated by the master radar IC. This signal indicates the moment at which all radar ICs should start sampling, and optionally may include an indication of the duration of the sampling window or the number of samples required. At start-up the radar ICs are configured to either use the external start-sampling signal or the internal start-sampling signal. For this, again as listed above, master IC switch 476 is opened and switches 474 and 475 are closed. For the slave radar ICs switch 476' is closed and switches 474' and 475' are opened. The point in the system where the synchronization is performed may be any of: in the ADC itself, in the optional decimation stage or in the DSP. Performing this in the decimation stage or the DSP may provide or allow for better resilience against transient effects.

As already discussed, embodiments provide for the distribution of the computation and data storing. Although it might be possible that all computations could be performed by supplying all measurement data to a single radar IC, in this case, each radar IC would need to be equipped with a DSP powerful enough to support a large number of antennas in a given time budget, which is generally unrealistic. In contrast by distributing the data the computation is shared by multiple DSPs. Furthermore, by spreading the data over multiple ICs the required memory space is kept low.

As already discussed, the data is divided in several parts (also referred to as ranges, or tranches) to distribute it to the other radar ICs. The number of parts may typically be equal to the number of radar ICs that are connected together.

Different options to divide the signal are possible, such that the received signal is divided in the distance dimension, the received signal is divided in the relative radial velocity dimension, or the received signal is divided in a both distance and velocity dimensions. Dividing the receiving signal in the distance dimension alone may generally be more robust against velocity ambiguity.

Figure 6:
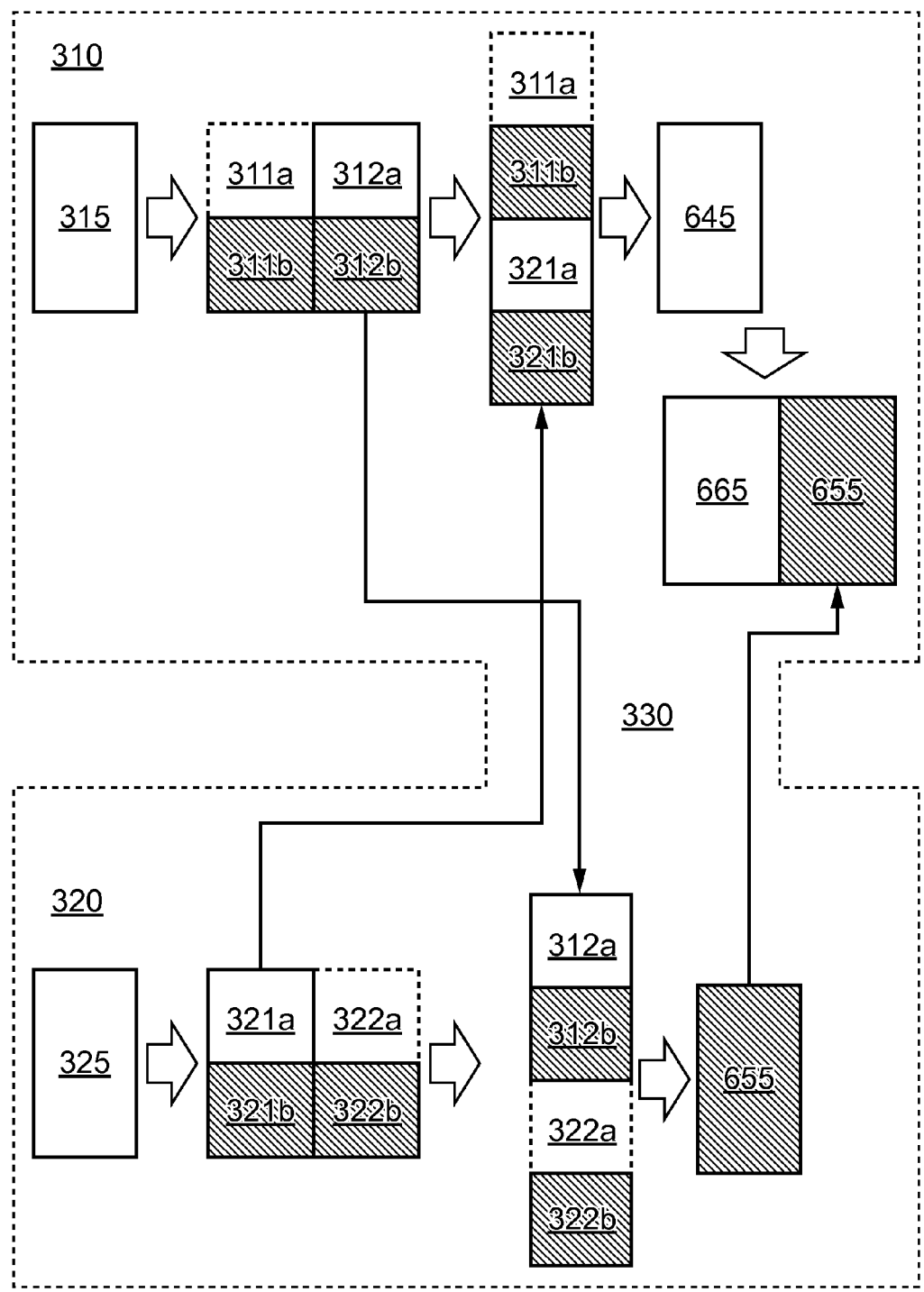
FIG. 6 shows, schematically, data sharing and combining processes between two radar ICs.

FIG. 6 shows the process of sharing data between two radar ICs, as shown in FIG. 3, along with subsequent steps in the process: each radar IC may perform part of the signal processing tasks to derive reduced data set 645 and 655 in the master and slave respectively. One aspect of these tasks is the detection of objects, using techniques with which the skilled person will be familiar. Since empty spaces (that is to say, regions in space in which there is not a relevant object) may be left out after the detection process, a significant data reduction may generally be obtainable. In embodiments, the reduced data set 655 is sent by the radar slave ICs 400' to the master IC 400 in which further signal processing such as object tracking may be performed, shown at 665 and 655. Each radar IC may send a list of parameters (also known as an object list) to the master radar IC. This list may include: distance to object, relative radial velocity, angle of arrival (azimuth and/or elevation) and a measure of the reliability of the detection (such as signal to noise ratio or likelihood).

Figure 7:
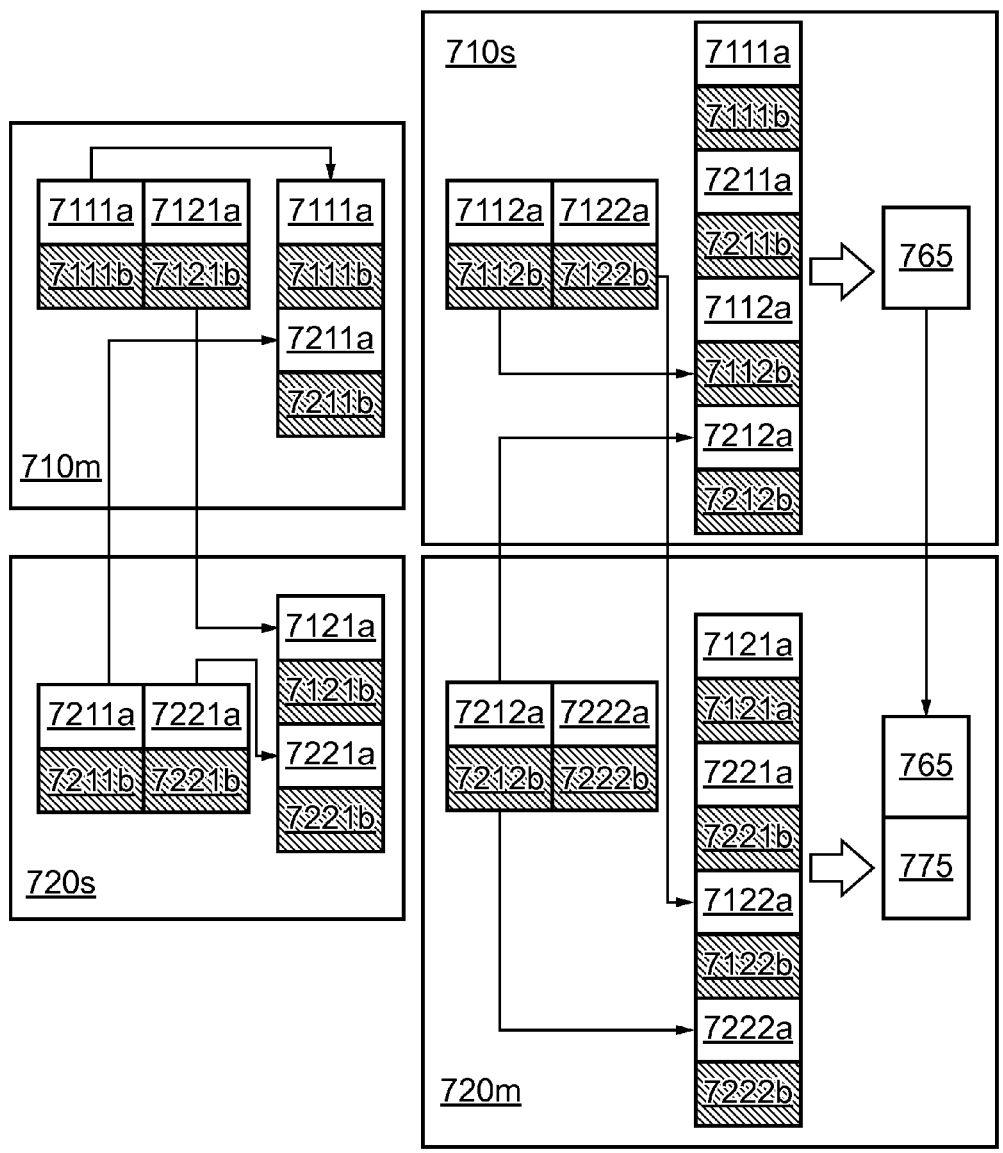
FIG. 7 shows, schematically, a multichip radar system using multiple transmitter antennas.

Another embodiment is shown schematically in FIG. 7. Whereas in the embodiments described above, a method to use the receiving antennas from multiple radar ICs has been disclosed, this embodiment extends to using the transmitter antennas from multiple radar ICs: in particular not only the transmitter antennas from the master are used, but also the transmitter antennas from the slave radar ICs. It is known that by using more than one transmit antenna the effective dimensions of the receiver array can be enlarged, and thus this embodiment may provide for a large effective antenna array aperture.

This embodiment is generally similar to those described above, with the exception that after completing the frequency ramps or chirps one of the slave ICs is assigned as a temporary master and the other ICs—including the IC previously acting as master—serve as slaves, for a subsequent set of frequency ramps. Such a set may be only one frequency ramp, or may be more than one frequency ramp. Therefore the LO and transmit antenna of this temporary master IC are used. As the physical transmit antenna is displaced relative to the previous master the effective aperture of the array of receive antennas can be enlarged even further. There may typically be as many measurement rounds as there are transmit antennas in all the slave radar ICs, and the slaves may be selected to act as master in any order. However, in such embodiments the amount of data may easily grow beyond the available memory. Therefore, a compromise will generally have to be made, for example by using fewer frequency chirps. Nonetheless this concept may be useful as it will generally provide for a higher angular resolution.

Again a data exchange phase is required. This phase can be executed after all measurements have been completed or, in a preferred embodiment, the data exchange is started after the first measurement round has been completed. The data exchange for each measurement is shown in FIG. 7. The figure shows two round of measurement, with a two-chip system. In a first round, ICs 710 acts as master IC (shown as 710*m* in the diagram), and IC 720 acts as slave (shown as 720*s*). The data exchange for this round is the same as that shown in FIG. 3. The numbering of the data parts corresponds to that in FIG. 3, but with a fourth digit "1" indicating the first round of measurement. Thus data-set 7111*a* corresponds to data-set 311*a*, and is the close-by data using receive antenna "a"; dataset 7221*b* corresponds to dataset 322*b*, and represents the faraway data, received using receiver antenna "b" from the slave IC 720*s*, and so forth. Data is exchanged such that the far-away data is collected in IC 720, and the close-by data in IC 710.

However this is followed by a second round of measurements, in which the ICs exchange function: that is to say IC 710 becomes a slave IC (710*s*), whilst IC 720 becomes the master IC (720*m*). The data derived from this round of measurements is depicted in the figure by having the digit "two" in the identifiers. This data is also distributed between the devices, such that the far-away data is collected in IC 720, and the close-by data in IC 710.

For this two-chip system, this represents the last of the measurement rounds. As shown, the data processing of each tranche, or sub-set, of data may be deferred until the conclusion of the measurements, and then the data is processed, to produce output data 765 and 775. Since IC 710 is now acting as the slave, the output data 765 is transferred to the IC 720, which is now acting as master, which collates the separate output data from each IC, and may carry out further signal processing, as described above. In other embodiments, part of the signal processing may be done after the reception of the return signal from the first chirp, without deferring until the measurements are fully concluded.

In summary, as the data from the distinct measurements originate from different transmit antennas the effective aperture of the receive array is increased.

Figure 8:
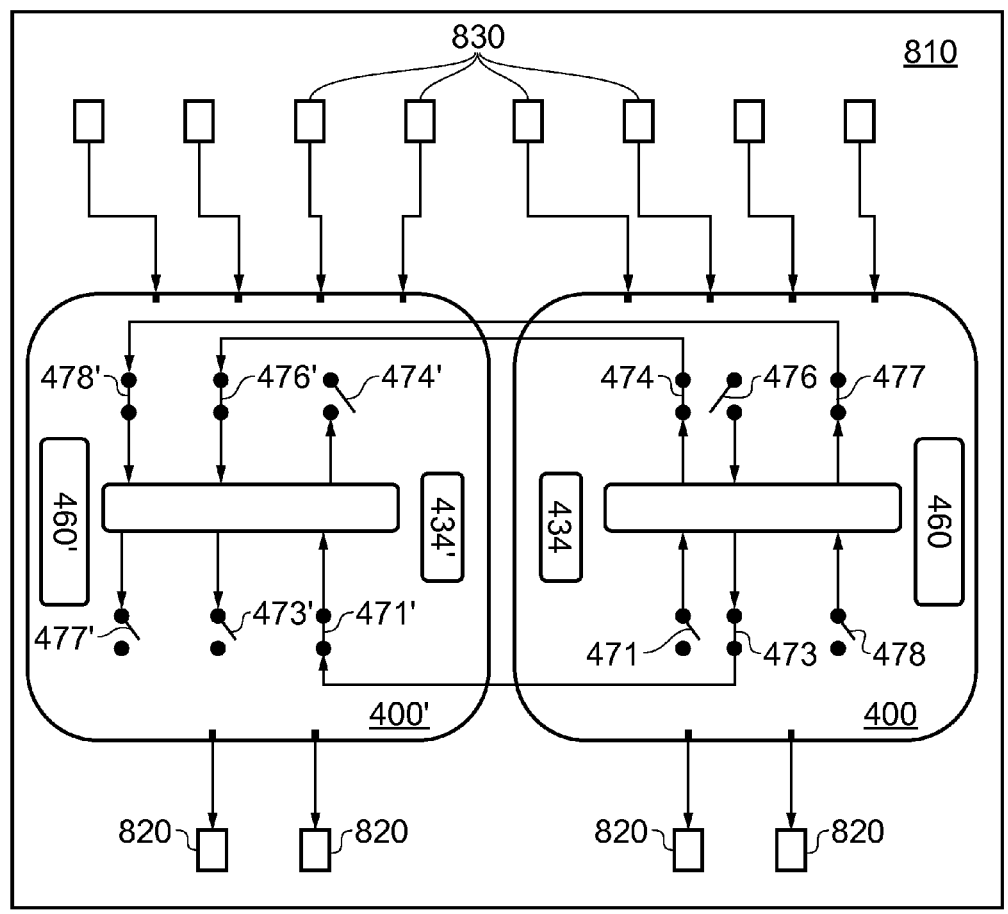
FIG. 8 shows, schematically, a multichip radar system having two radar ICs, one of which is configured as a master IC and the other as a slave IC.

FIG. 8 illustrates an embodiment in which the multichip radar system comprises two reconfigurable ICs, one of which 400 is configured to operate as a master IC, and the other of which 400' is configured to operate as a slave IC, in which the reconfigurable ICs are mounted, adjacent to each other, on a printed circuit board (PCB) 810. As shown, the PCB includes contact pads 820 for an array of transmitter antennas, and contact pads 830 for an array of receiver antennas. The two ICs are connected by means of high-speed digital interface 434, 434', to enable the exchange of tranches of the down-converted reflected signals. As shown, whilst being operated in the configurations such that IC 400 is operating as a master IC, and IC 400' is operating as a slave IC, the "input" switches 471, 476 and 478 for the master IC are open, whereas the "output" switches 473, 474 and 477 are closed; conversely the "input" switches 471', 476' and 478' for the slave IC are closed, whereas the "output" switches 473', 474' and 477' are open. The skilled person will appreciate that the embodiment of FIG. 8 can be readily extended to 3 or more ICs, and that, in contrast to known multichip radar systems, each IC 400, 400' may be identical. The skilled person will appreciate that in embodiments having three or more ICs, in which there are more than two ICs configured to operate as slave ICs, the high-speed digital interface may include a switching mechanism in order to provide that data can be transferred between the IC configured to operate as a master IC, and each of the ICs configured to operate as a slave IC. In such embodiments one or more of the IC's configured to operate as a slave IC may be configured to forward data received from the master IC to another slave IC.

The skilled person will further appreciate that embodiments may enable sharing of information between multiple, highly integrated, radar ICs in such a way that increases the angle of arrival resolution and/or signal to noise ratio of the received signals, and thus multiple application areas may be addressed by combining two or more identical radar ICs. Any one or more of the following sub-problems may be alleviated or overcome: firstly, conventionally, a radar IC only has access to its own antenna signals, whereas to increase the resolution of the angle of arrival coherent processing of all antenna signals may be required. Secondly, the processing power of a single IC cannot in general support the real time signal processing of more antennas than are present in a single IC, since the processing is relatively very intensive. By distributing processing across multiple ICs, the processing power of any single IC may be kept relatively low. Thirdly, a single radar IC typically only has enough memory to store measurement data from its own antennas. By distributing the data between ICs, more data may be processed than could be stored on a single IC. And fourthly, conventionally the received signals on different radar ICs are not synchronized since they derive their clock signal from different references. By providing common clock signals—either from one of the ICs acting as a master IC, or form a separate service chip, this problem may be overcome.

In addition, providing a system according to embodiments may increase the reliability of the radar system, by distributing the overall sensor function in an Advanced Driver Assistance System (ADAS) over multiple ICs. If for instance the DSP in one of the ICs fails, it may be possible to arrange that the data from that IC can still be processed by one of the other sensors at reduced performance. To that end, in embodiments having a number N of identical radar ICs, the measurement data may be divided into N−1 parts, and distributed to the "good" ICs that is to say the ICs in which the DSP has not failed.

From reading the present disclosure, other variations and modifications will be apparent to the skilled person. Such variations and modifications may involve equivalent and other features which are already known in the art of automotive radar, and which may be used instead of, or in addition to, features already described herein.

According to embodiments there is herein disclosed:
a multimode IC for a radar system, the multimode IC comprising: a receiver adapted to receive a reflected radar signal and to down-convert the reflected radar signal to an IF (intermediate frequency) signal using a local oscillator signal; an ADC circuit adapted to sample the IF signal for a period determined by a timing signal and to produce a digital signal from the sampled IF signal; a digital signal processor adapted to divide the digital signal into a part and at least one further part, and further adapted to process the part, being a retained part, of the digital signal and a received part of a further digital signal to provide information from the retained part and the received part; and an interface circuit adapted to send the further part of the digital signal to a further IC and to receive the received part of the further digital signal from the further IC; wherein the multimode IC is configurable to be operable in a master mode and a slave mode and further comprises: a transmitter adapted to, in the master mode, generate a radar signal and transmit the radar signal; a local oscillator circuit adapted to, in the slave mode, input the local oscillator signal; a dock signal circuit adapted to, in the slave mode, input the dock signal; and a timing signal circuit adapted to, in the slave mode input the timing signal.

In some embodiments, the local oscillator circuit is adapted to, in theme master mode, generate and output the local oscillator signal; the dock signal circuit is adapted to, in the master mode, generate and output a dock signal; and the timing signal circuit is adapted to, in the master mode, generate and output a timing signal.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub-combination. The applicant hereby gives notice that new claims may be formulated to such features and/or combinations of such features during the prosecution of the present application or of any further application derived therefrom. For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A multichip radar system, comprising a plurality of configurable ICs, and a digital interface therebetween, each configurable IC being configurable to operate as a master IC and as a slave IC, and to have an allocated measurement range;
   wherein each configurable IC comprises:
      a down-converter adapted to down-convert a respective reflected radar signal;
      an ADC adapted to convert the respective down-converted signal to a respective digital signal for a common sampling window to accumulate respective digital data;
      a digital signal processor adapted to divide the respective digital data between a plurality of measurement ranges, the digital signal processor being further adapted
         to receive digital data corresponding to the IC's allocated measurement range from each of the other ICs,
         to send digital data corresponding to each other allocated measurement range to the respective other IC, and
         to process the digital data in its allocated measurement range;

and a transmitter adapted to transmit a radar signal;
wherein a one of the configurable ICs is configured to operate as a master IC and is configured to transmit a radar signal and each of the other configurable ICs is configured to operate as a slave IC; and
wherein each configurable IC is adapted to use a common Local Oscillator signal, a common clock signal, and a common timing signal for determining at least the start of the common sampling window.

2. A multichip radar system as claimed in claim 1, wherein each configurable IC further comprises:
a Local Oscillator generator for generating a Local Oscillator signal;
a clock generator for generating a clock signal;
and a timing signal generator for generating a timing signal;
and wherein the Local Oscillator signal of the master IC is the common Local Oscillator signal,
the clock signal of the master IC is the common clock signal and
the timing signal generated of the master IC is the common timing signal.

3. A multichip radar system as claimed in claim 2, wherein each configurable IC further comprises a local oscillator input switch and a local oscillator output switch, a clock input switch and a clock output switch, and a timing signal input switch and a timing signal output switch,
wherein the master IC is configured to output the common local oscillator signal, the common clock signal and the common timing signal, and
wherein the one or more slave ICs are each configured to input the common local oscillator signal, the common clock signal and the common timing signal.

4. A multichip radar system as claimed in claim 1, configured such that the master IC transmits the radar signal resulting in the respective reflected radar signals.

5. A multichip radar system as claimed in claim 1, adapted to transmit multiple chirps, and further adapted to, between two successive chirps, both reconfigure the master IC to become a slave IC and reconfigure a slave IC to become the master IC.

6. An intelligent automobile control system comprising a multichip radar system as claimed in claim 1, and a data-processing system configured as at least one of an electronic brake assist system, a blindspot detection system, a rear cross traffic alert system, and a cruise control system.

7. A configurable IC adapted for use, both as a master IC and as a slave IC, in a multichip radar system as claimed in claim 1, and adapted to use an external Local Oscillator signal, an external common clock signal, and an external common timing signal for determining at least the start of the sampling window.

8. A configurable IC adapted for use both as a master IC and as a slave IC, in a multichip radar system as claimed in claim 2.

9. A method of operating a multichip radar system comprising a plurality of configurable ICs, the method comprising:
allocating one of the configurable ICs as a master IC and the remainder of the configurable ICs as slave ICs;
allocating a measurement range to each of the configurable ICs;
operating each configurable IC using a common Local Oscillator signal, a common clock signal, and a common timing signal for determining a common sampling window;
the master IC transmitting a radar signal;
each configurable IC down-converting a respective reflected radar signal;
each configurable IC converting the respective down-converted signal, by means of an ADC, to a respective digital signal for the common sampling window to accumulate respective digital data;
each configurable IC dividing the respective digital data between a plurality of measurement ranges;
each configurable IC receiving digital data corresponding to the IC's allocated measurement range from each of the other ICs;
each configurable IC sending digital data corresponding to each other allocated measurement range to the respective other IC;
each configurable IC processing the digital data in its allocated measurement range; and
each slave IC sending the respective result from the digital data processing to the master IC.

10. The method of claim 9, further comprising the master IC generating the common Local Oscillator signal, the common clock signal, and the common timing signal.

11. The method of claim 9, wherein the radar signal is a chirp, the method further comprising transmitting a plurality of chirps.

12. The method of claim 9, further comprising, between successive chirps, both reconfiguring the master IC to become a slave IC and reconfiguring a slave IC to become the master IC.

13. The method of claim 9, wherein the measurement ranges relate to a single dimension and dividing the respective digital data between a plurality of measurement ranges is effected by means of a fast Fourier transform into that dimension.

14. The method of any of claim 9, wherein the measurement ranges relate to two dimensions, and the dividing the respective digital data between a plurality of measurement ranges is effected by means of a two-dimensional fast Fourier transform into those two dimensions.

15. The method of claim 10, wherein each configurable IC comprises at least one of at least two transmit antennas and at least two receive antennas, and the method further comprises at least one of selecting a transmit antenna of the master IC to transmit the radar signal, and selecting a receive antenna for each of the configurable ICs to receive the respective reflected radar signal.

* * * * *